US010303502B2

(12) United States Patent
Rinta-Aho et al.

(10) Patent No.: US 10,303,502 B2
(45) Date of Patent: May 28, 2019

(54) CREATING A VIRTUAL MACHINE FOR AN IP DEVICE USING INFORMATION REQUESTED FROM A LOOKUP SERVICE

(71) Applicant: TELEFONAKTIEBOLAGET L M ERICSSON (PUBL), Stockholm (SE)

(72) Inventors: Teemu Rinta-Aho, Espoo (FI); Heikki Mahkonen, San Jose, CA (US); Tero Kauppinen, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 113 days.

(21) Appl. No.: 15/031,236

(22) PCT Filed: Nov. 7, 2013

(86) PCT No.: PCT/SE2013/051308
§ 371 (c)(1),
(2) Date: Apr. 21, 2016

(87) PCT Pub. No.: WO2015/069157
PCT Pub. Date: May 14, 2015

(65) Prior Publication Data
US 2016/0246638 A1 Aug. 25, 2016

(51) Int. Cl.
*G06F 9/455* (2018.01)
*G06F 9/50* (2006.01)
*H04L 29/12* (2006.01)

(52) U.S. Cl.
CPC ........ *G06F 9/45558* (2013.01); *G06F 9/5055* (2013.01); *G06F 9/5072* (2013.01);
(Continued)

(58) Field of Classification Search
CPC .. G06F 9/5055; G06F 9/5072; G06F 9/45558; G06F 2009/45595; H04L 61/2015; H04L 61/6059
See application file for complete search history.

(56) References Cited

U.S. PATENT DOCUMENTS 8,438,654 B1 * 5/2013 von Eicken ............. G06F 21/53
709/217
2010/0299674 A1 * 11/2010 Wang .................... H04L 47/805
718/104

(Continued)

OTHER PUBLICATIONS

Droms, Dynamic Host Configuration Protocol, Network Working Group RFC 2131, Mar. 1997.

(Continued)

*Primary Examiner* — Abu Ghaffari
*Assistant Examiner* — Michael W Ayers (57) ABSTRACT

The present disclosure relates to a method performed by an IP capable network node in a communication network. The method comprises receiving an IP message from an IP capable device, said IP message comprising an indication that the IP capable device requires a VM to be set up. The method also comprises sending an initiation message to a cloud service platform requesting the cloud service platform to set up the VM for the IP capable device. The method also comprises receiving a service information message from the cloud service platform comprising information about the VM set up by the cloud service platform. The method also comprises sending an IP message to the IP capable device comprising information about the VM set up for said device, allowing the device to send IP data to the VM.

18 Claims, 4 Drawing Sheets

(52) U.S. Cl.
CPC ............... *G06F 2009/45595* (2013.01); *H04L 61/2015* (2013.01); *H04L 61/6059* (2013.01)

(56) References Cited

U.S. PATENT DOCUMENTS

| | | | | |
|---|---|---|---|---|
| 2010/0325278 | A1* | 12/2010 | Heim | G06F 9/4416 709/226 |
| 2011/0078679 | A1* | 3/2011 | Bozek | G06F 9/455 718/1 |
| 2011/0138047 | A1 | 6/2011 | Brown et al. | |
| 2011/0295986 | A1 | 12/2011 | Ferris et al. | |
| 2012/0137003 | A1 | 5/2012 | Ferris et al. | |
| 2012/0324071 | A1* | 12/2012 | Gulati | G06F 9/5033 709/223 |
| 2013/0132247 | A1* | 5/2013 | Shimogawa | G06Q 30/04 705/34 |
| 2013/0268672 | A1 | 10/2013 | Justafort et al. | |
| 2014/0032920 | A1* | 1/2014 | Gehrmann | G06F 21/57 713/176 |
| 2014/0068608 | A1* | 3/2014 | Kulkarni | G06F 9/45558 718/1 |
| 2014/0075438 | A1* | 3/2014 | He | H04L 67/08 718/1 |
| 2014/0282520 | A1* | 9/2014 | Sabharwal | G06F 9/455 718/1 |
| 2015/0007175 | A1* | 1/2015 | Potlapally | G06F 21/57 718/1 |
| 2016/0179567 | A1* | 6/2016 | Ding | G06F 9/45558 718/1 |

OTHER PUBLICATIONS

Narten, et al., Neighbor Discovery for IP version 6 (IPv6), Network Working Group RFC 4861, Sep. 2007.
Droms, Dynamic Host Configuration Protocol for IPv6 (DHCPv6), Network Working Group RFC 3315, Jul. 2003.

* cited by examiner

CREATING A VIRTUAL MACHINE FOR AN IP DEVICE USING INFORMATION REQUESTED FROM A LOOKUP SERVICE

This application is a 371 of International Application No. PCT/SE2013/051308, filed Nov. 7, 2013, the disclosure of which is fully incorporated herein by reference.

TECHNICAL FIELD

The present disclosure relates to devices and methods for setting up a virtual machine for an Internet Protocol (IP) capable device.

BACKGROUND

When machine-to-machine (M2M) devices (e.g. a sensor) connect to a network, the network must be configured to handle the information provided by the devices. In practice this means the network needs to know where to send the data provided by the device.

Current cloud environments provide application programming interfaces (APIs) to remotely manage virtual machines. This requires support for the API in a remote node (e.g. NOVA API). Virtual machines can be used for virtualization of processing power and resources of a physical machine.

Creation and usage of virtual machines require IP connectivity. Practically all IP devices are capable of using either IPv4 Dynamic Host Configuration Protocol (DHCP) or IPv6 Neighbor Discovery (ND).

The cloud concept provides an environment which supports dynamic creation of virtual machines (VMs) that can be assigned to handle the device data. The cloud environment provides better scalability than a traditional data center model. The motivation to create a dedicated virtual machine for each user is also to provide a database for collected sensor data that is accessible even if the actual sensor is no longer reachable.

Normally, devices that need to virtualize processing power and resources are constrained devices, e.g. M2M or Internet of Things (IoT) devices, regarding available memory and central processing unit (CPU) power. For this reason, implementing cloud environment clients for these devices is not practical. However, the devices are normally IP capable and therefore extensions to the IP configuration protocols can be used to achieve virtualization support.

SUMMARY

Manual configuration and management of a setup with dedicated VM is not practical due to the anticipated number of varying (i.e. from different vendors and for different purposes) IP capable devices, e.g. M2M or IoT devices, in the future. In the present disclosure there is therefore introduced a mechanism to automatically configure the environment when IP devices connect to the network, possibly for the first time.

According to an aspect of the present disclosure, there is provided a method performed by an IP capable network node in a communication network. The method comprises receiving an IP message from an IP capable device, said IP message comprising an indication that the IP capable device requires a VM to be set up. The method also comprises sending an initiation message to a cloud service platform requesting the cloud service platform to set up the VM for the IP capable device. The method also comprises receiving a service information message from the cloud service platform comprising information about the VM set up by the cloud service platform. The method also comprises sending an IP message to the IP capable device comprising information about the VM set up for said device, allowing the device to send IP data to the VM.

According to another aspect of the present disclosure, there is provided a computer program product comprising computer-executable components for causing an IP capable network node to perform an embodiment of the method performed by an IP capable network node of the present disclosure when the computer-executable components are run on processor circuitry comprised in the node.

According to another aspect of the present disclosure, there is provided an IP capable network node in a communication network. The node comprises processor circuitry, and a storage unit storing instructions that, when executed by the processor circuitry, cause the node to receive an IP message from an IP capable device, said IP message comprising an indication that the IP capable device requires a VM to be set up. The instructions also cause the node to send an initiation message to a cloud service platform, requesting the cloud service platform to set up the VM for the IP capable device. The instructions also cause the node to receive a service information message from the cloud service platform comprising information about the VM set up by the cloud service platform. The instructions also cause the node to send an IP message to the IP capable device comprising information about the VM set up for said device for allowing the device to send data to the VM. The IP capable network node may be configured to perform an embodiment of the method performed by an IP capable network node discussed herein, and may thus comprise means for performing said method.

According to another aspect of the present disclosure, there is provided a computer program comprising computer program code which is able to, when run on processor circuitry of an IP capable network node in a communication network, cause the network node to receive an IP message from an IP capable device, said IP message comprising an indication that the IP capable device requires a VM to be set up. The code is also able to cause the node to send an initiation message to a cloud service platform, requesting the cloud service platform to set up the VM for the IP capable device. The code is also able to cause the node to receive a service information message from the cloud service platform comprising information about the VM set up by the cloud service platform. The code is also able to cause the node to send an IP message to the IP capable device about the VM set up for said device for allowing the device to send data to the VM.

According to another aspect of the present disclosure, there is provided a method performed in an IP capable device in a communication network. The method comprises sending an IP message to an IP capable network node, said IP message comprising an indication that the IP capable device requires a VM to be set up. The method also comprises receiving an IP message from the IP capable network node comprising information about the VM set up for said device, allowing the device to send IP data to the VM. The method also comprises sending IP data to the VM.

According to another aspect of the present disclosure, there is provided a computer program product comprising computer-executable components for causing an IP capable device to perform an embodiment of the method performed in an IP capable device of the present disclosure when the computer-executable components are run on processor circuitry comprised in the device.

According to another aspect of the present disclosure, there is provided an IP capable device in a communication network. The device comprises processor circuitry, and a storage unit storing instructions that, when executed by the processor circuitry, cause the device to send an IP message to an IP capable network node, said IP message comprising an indication that the IP capable device requires a VM to be set up. The instructions also cause the device to receive an IP message from the IP capable network node comprising information about the VM set up for said device, allowing the device to send IP data to the VM. The instructions also cause the device to send IP data to the VM. The IP capable device may be configured to perform an embodiment of the method performed by an IP capable device discussed herein, and may thus comprise means for performing said method.

According to another aspect of the present disclosure, there is provided a computer program comprising computer program code which is able to, when run on processor circuitry of an IP capable device in a communication network, cause the device to send an IP message to an IP capable network node, said IP message comprising an indication that the IP capable device requires a VM to be set up. The code is also able to cause the device to receive an IP message from the IP capable network node comprising information about the VM set up for said device, allowing the device to send IP data to the VM. The code is also able to cause the node to send IP data to the VM.

According to another aspect of the present disclosure, there is provided a method performed by a lookup server in a communication network. The method comprises receiving a lookup request message from an IP capable network node, requesting information about a cloud service platform for setting up a VM for an IP capable device other than the IP capable network node. The method also comprises sending a lookup information message to said IP capable network node, comprising the requested information.

According to another aspect of the present disclosure, there is provided a computer program product comprising computer-executable components for causing a lookup server to perform an embodiment of the method performed by a lookup server of the present disclosure when the computer-executable components are run on processor circuitry comprised in the server.

According to another aspect of the present disclosure, there is provided a lookup server in a communication network. The server comprises processor circuitry, and a storage unit storing instructions that, when executed by the processor circuitry, cause the server to receive a lookup request message from an IP capable network node, requesting information about a cloud service platform for setting up a VM for an IP capable device other than the IP capable network node. The instructions also cause the server to send a lookup information message to said IP capable network node, comprising the requested information. The lookup server may be configured to perform an embodiment of the method performed by a lookup server discussed herein, and may thus comprise means for performing said method.

According to another aspect of the present disclosure, there is provided a computer program comprising computer program code which is able to, when run on processor circuitry of a lookup server in a communication network, cause the server to receive a lookup request message from an IP capable network node, requesting information about a cloud service platform for setting up a VM for an IP capable device other than the IP capable network node. The code is also able to cause the server to send a lookup information message to said IP capable network node, comprising the requested information.

According to another aspect of the present disclosure, there is provided a method performed by a cloud service platform configured for setting up a VM within said cloud service platform in a communication network. The method comprises receiving an initiation message from an IP capable network node in the communication network, requesting the cloud service platform to set up a VM for an IP capable device other than the IP capable network node. The method also comprises setting up the VM. The method also comprises sending a service information message to the IP capable network node, comprising information about the VM set up by the cloud service platform. The method also comprises receiving IP data to the VM from the IP capable device.

According to another aspect of the present disclosure, there is provided a computer program product comprising computer-executable components for causing a cloud service platform to perform an embodiment of the method performed by a cloud service platform of the present disclosure when the computer-executable components are run on processor circuitry comprised in the cloud service platform.

According to another aspect of the present disclosure, there is provided a cloud service platform configured for setting up a VM within said cloud service platform in a communication network. The cloud service platform comprises processor circuitry, and a storage unit storing instructions that, when executed by the processor circuitry, cause the cloud service platform to receive an initiation message from an IP capable network node in the communication network, requesting the cloud service platform to set up a VM for an IP capable device other than the IP capable network node. The instructions also cause the cloud service platform to set up the VM. The instructions also cause the cloud service platform to send a service information message to the IP capable network node, comprising information about the VM set up by the cloud service platform. The instructions also cause the cloud service platform to receive IP data to the VM from the IP capable device. The cloud service platform may be configured to perform an embodiment of the method performed by a cloud service platform discussed herein, and may thus comprise means for performing said method.

According to another aspect of the present disclosure, there is provided a computer program comprising computer program code which is able to, when run on processor circuitry of a cloud service platform in a communication network, cause the cloud service platform node to receive an initiation message from an IP capable network node in the communication network, requesting the cloud service platform to set up a VM for an IP capable device other than the IP capable network node. The code is also able to cause the cloud service platform to set up the VM. The code is also able to cause the cloud service platform to send a service information message to the IP capable network node, comprising information about the VM set up by the cloud service platform. The code is also able to cause the cloud service platform to receive IP data to the VM from the IP capable device.

According to another aspect of the present disclosure, there is provided a computer program product comprising an embodiment of a computer program of the present disclosure and a computer readable means on which the computer program is stored.

In accordance with the aspects of the present disclosure, it is enabled for a network node to help set up a VM for an IP capable device, obviating the need for the IP capable device to set it up itself. This may be especially beneficial in case of a constrained IP capable device with limited processing, memory and/or power capabilities. Also, the need for manually setting up the VM can be obviated by means of the present disclosure.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Embodiments of the present disclosure may advantageously provide dynamic cloud services for constraint devices, avoiding sending bytes over a radio link [e.g. JavaScript Object Notation (JSON) or Extensible Mark-up Language (XML) negotiation signalling] by delegating heavy signalling into the network, and/or use the existing signalling to convey information between a router and IP devices [e.g. Dynamic Host Configuration Protocol (DHCP) and Neighbor Discovery Protocol (ND)].

That a node or device is IP capable, or an IP device/node, implies that the node or device is capable of communicating in accordance with an Internet Protocol (IP) communication standard, wirelessly or via wire, e.g. IPv4 or IPv6.

Figure 1:
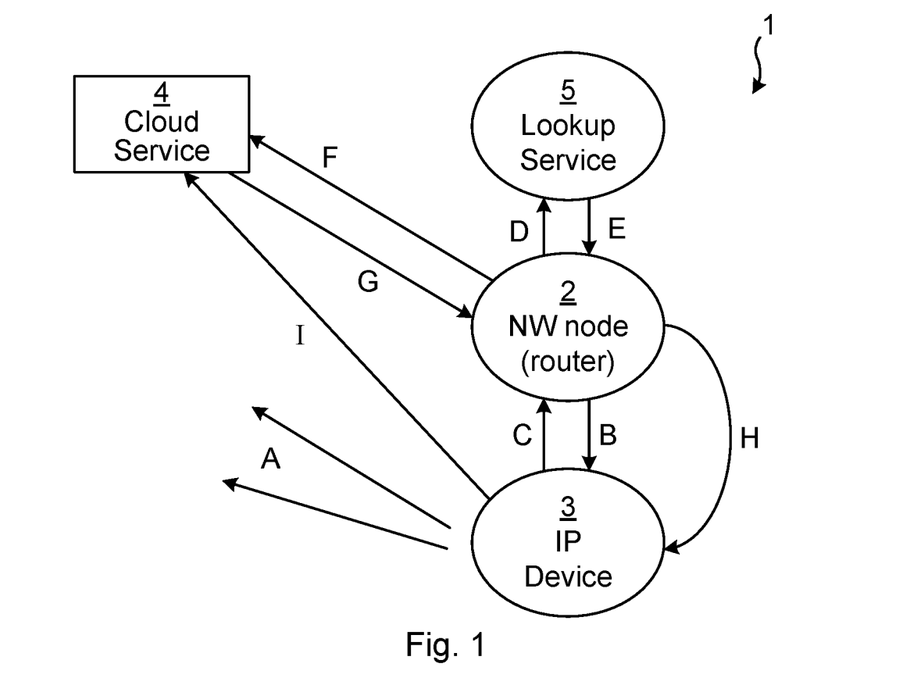
FIG. 1 is a schematic block diagram of an embodiment of a communication network in accordance with the present disclosure.

FIG. 1 schematically illustrates an embodiment of a communication network 1 in accordance with the present disclosure. An IP capable network (NW) node 2 is associated with an IP capable device 3. The NW node 2 may be a router e.g. a default gateway or closest router for the IP device 3, or any other server or node in the network 1 which is capable to operate as the NW node 2 in accordance with the present disclosure. The NW node 2 may be implemented with The Router Advertisement Daemon (radvd) if convenient. The NW node 2 is able to communicate with the IP device 3 in accordance with an IP communication standard, typically wirelessly over a radio interface, but wired embodiments are also contemplated. The IP device 3 may be any device capable of communicating in accordance with an IP standard. As mentioned above, embodiments of the present disclosure may be especially beneficial for an IP device 3 which is a constrained device, e.g. a M2M or IoT device such as a sensor or detector. The NW node 2 is also able to communicate with a cloud service platform 4 which is capable of providing cloud services such as a VM for the IP device 3, and which may comprise one or a plurality of cloud servers providing the cloud service platform 4. By means of communication with both the IP device 3 and the cloud service platform 4, the NW node 2 can set up a VM, or rather prompt the cloud service platform 4 to set up a VM, for the IP device 3, thus freeing the IP device 3 from setting it up. In some embodiments, the NW node 2 may communicate with a plurality of cloud service platforms 4 in order to find a suitable cloud service platform 4 with capability of providing a VM for the IP device 3. Thus, the NW node 2 may act as a cloud broker in some embodiments. The network 1 may, in some embodiments, also comprise a lookup service 5, comprising one or a plurality of lookup servers, for holding information which may be relevant for the setting up of the VM. The NW node 2 is then able to communicate with the lookup service 5 for obtaining such information. The information may include information about the IP device 3 such as information about what type and amount of data it produces and how it should be handled by the VM thus giving desired properties of the VM to be set up. Additionally or alternatively, the information may include information about available cloud service(s) provided by cloud service platform(s) 4 thus allowing the choice of a suitable cloud service platform 4 for setting up the VM. In some embodiments, the lookup service 5 may be able to communicate (not shown in FIG. 1) with the cloud service platform 4, and possibly with a plurality of cloud service platforms, for obtaining information about the cloud service platform 4 and/or cloud service(s) which may be provided thereby. Then, the lookup service may function as a cloud broker for choosing a suitable cloud service platform 4.

FIG. 1 also illustrates some messages sent within the network 1 in accordance with some embodiments of the present disclosure. This message sequence is only given as an example.

An IP device 3 sends a broadcast message A, e.g. a router solicitation (RS) message with an indication that it requests a special cloud service, i.e. a VM.

A NW node 2, e.g. a router, capable of providing IP devices 3 with cloud services receives the broadcast message A and sends a message B to the IP device 3 advertising its capability for such services. The capability is indicated, for example, by a flag in a router advertisement (RA).

The IP device 3 receives the message B from the NW node 2 and responds with a message C e.g. a neighbor solicitation (NS) message indicating its willingness to utilize the service, possibly with the IP device 3 identity included to the NW node 2.

Upon receiving the message C from the IP device 3, the NW node may resolve the contact information (e.g. uniform resource locator, URL) by sending an information request message D to a lookup service/server 5, possibly including the information, e.g. the identity, of the IP device 3.

The lookup service 5 responds to the message D with a message E comprising the requested information, e.g. vendor specific cloud service contact information, to the NW node 2.

The NW node 2 receives the message E and uses the thus received information to form a message F to the cloud service platform 4, prompting it to set up a cloud service, i.e. the VM, for the IP device 3 in the cloud service platform 4.

The cloud service platform receives the message F and sets up the VM. The cloud service platform 4 then sends a message G to the NW node 2 with the VM contact information.

The NW node forwards the VM contact information to the IP device 3 in a message H, e.g. a neighbor advertisement (NA).

The IP device 3, having received the VM contact information in message H, starts sending data, e.g. sensor data, to the VM in the cloud service platform 4, message I.

Figure 2:
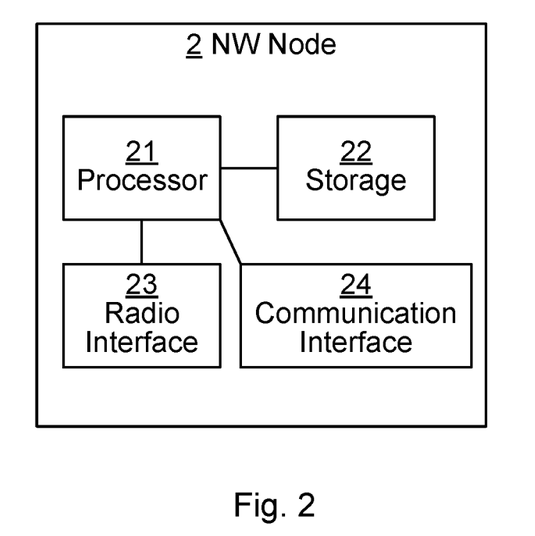
FIG. 2 is a schematic block diagram of an embodiment of an IP capable network node of the present disclosure.

FIG. 2 illustrates an embodiment of an IP capable NW node 2 of the present disclosure. NW node 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor 21, e.g. an application specific integrated circuit (ASIC), a field programmable gate array (FPGA) or a complex programmable logic device (CPLD). The processor 21 is configured to run one or several computer program(s) or software stored in a storage unit 22 e.g. a memory. The storage unit is regarded as a computer readable means as discussed herein and may e.g. be in the form of a Random Access Memory (RAM), a Flash memory or other solid state memory, or a hard disk, or be a combination thereof. The processor circuitry 21 is also configured to store data in the storage unit 22, as needed. The NW node 2 also comprises a communication interface, typically a radio interface, 23 for communication with the IP device 3 as discussed herein. Additionally, the NW node 2 comprises a communication interface 24, which may be integrated with or separate from the radio interface 23, for communication with other nodes in the network 1, such as the cloud service platform 4 and possibly a lookup service 5.

Figure 3:
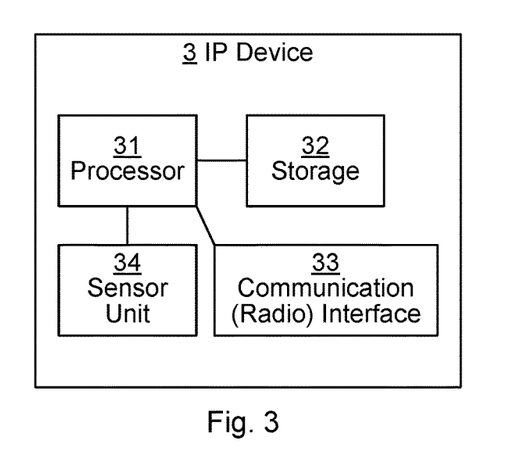
FIG. 3 is a schematic block diagram of an embodiment of an IP capable device of the present disclosure.

FIG. 3 illustrates an embodiment of an IP capable device 3 of the present disclosure. IP device 3 comprises processor circuitry 31 e.g. a central processing unit (CPU). The processor circuitry 31 may comprise one or a plurality of processing units in the form of microprocessor(s). However, other suitable devices with computing capabilities could be comprised in the processor 31, e.g. an application specific integrated circuit (ASIC), a field programmable gate array (FPGA) or a complex programmable logic device (CPLD). The processor 31 is configured to run one or several computer program(s) or software stored in a storage unit 32 e.g. a memory. The storage unit is regarded as a computer readable means as discussed herein and may e.g. be in the form of a Random Access Memory (RAM), a Flash memory or other solid state memory, or a hard disk, or be a combination thereof. The processor circuitry 31 is also configured to store data in the storage unit 32, as needed. The IP device 3 also comprises a communication interface, typically a radio interface, 33 for communication with the network e.g. the NW node 2 as discussed herein. The IP device may be a constrained device, e.g. a sensor, and may thus in some embodiments also comprise a sensor unit 34 for obtaining sensor/detector measurement data which may then be sent to the network e.g. the VM in the cloud service platform 4 as discussed herein.

Figure 4:
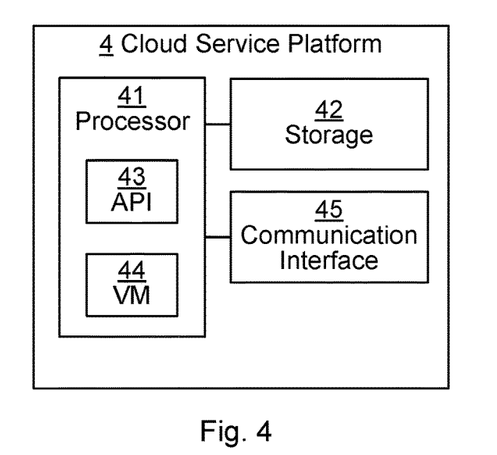
FIG. 4 is a schematic block diagram of an embodiment of a cloud service platform node of the present disclosure.

FIG. 4 illustrates an embodiment of a cloud service platform 4 of the present disclosure. The cloud service platform 4 comprises processor circuitry 41 e.g. a central processing unit (CPU). The processor circuitry 41 may comprise one or a plurality of processing units in the form of microprocessor(s). However, other suitable devices with computing capabilities could be comprised in the processor 41, e.g. an application specific integrated circuit (ASIC), a field programmable gate array (FPGA) or a complex programmable logic device (CPLD). The processor 41 is configured to run one or several computer program(s) or software stored in a storage unit 42 e.g. a memory. The storage unit is regarded as a computer readable means as discussed herein and may e.g. be in the form of a Random Access Memory (RAM), a Flash memory or other solid state memory, or a hard disk, or be a combination thereof. The processor circuitry 41 is also configured to store data in the storage unit 42, as needed. The cloud service platform 4 also comprises a communication interface, wired or wireless, 45 for communication with other nodes in the network 1 e.g. the NW node 2, as well as the for receiving data I from the IP device 3, and possibly the lookup service 5, as discussed herein. Within the cloud service platform 4, a cloud API 43 as well as a VM 44 for the IP device 3 are set up and are in FIG. 4 illustrated as software modules within the processor circuitry 41.

Figure 5:
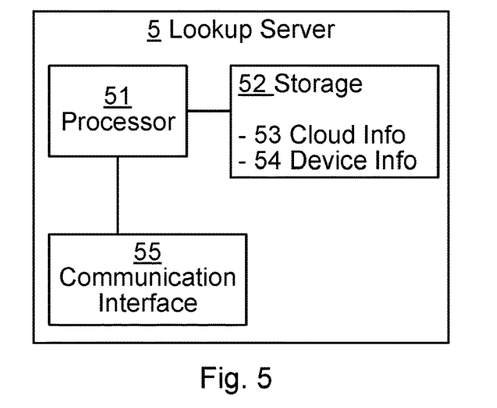
FIG. 5 is a schematic block diagram of an embodiment of a lookup service server of the present disclosure.

FIG. 5 illustrates an embodiment of a lookup service/server 5 of the present disclosure. The lookup server 5 comprises processor circuitry 51 e.g. a central processing unit (CPU). The processor circuitry 51 may comprise one or a plurality of processing units in the form of microprocessor(s). However, other suitable devices with computing capabilities could be comprised in the processor 51, e.g. an application specific integrated circuit (ASIC), a field programmable gate array (FPGA) or a complex programmable logic device (CPLD). The processor 51 is configured to run one or several computer program(s) or software stored in a storage 52 e.g. a memory. The storage is also configured for holding information desired for setting up the VM, e.g. cloud information 53 about available cloud service(s) in cloud service platform(s) 4 and device information 54 about the IP device 3. The storage unit is regarded as a computer readable means as discussed herein and may e.g. be in the form of a Random Access Memory (RAM), a Flash memory or other solid state memory, or a hard disk, or be a combination thereof. The processor circuitry 51 is also configured to store data in the storage unit 52, as needed. The lookup server 5 also comprises a communication interface, wired or wireless, 55 for communication with other nodes in the network 1 e.g. the NW node 2, and possibly the cloud service platform 4, as discussed herein.

Figure 6:
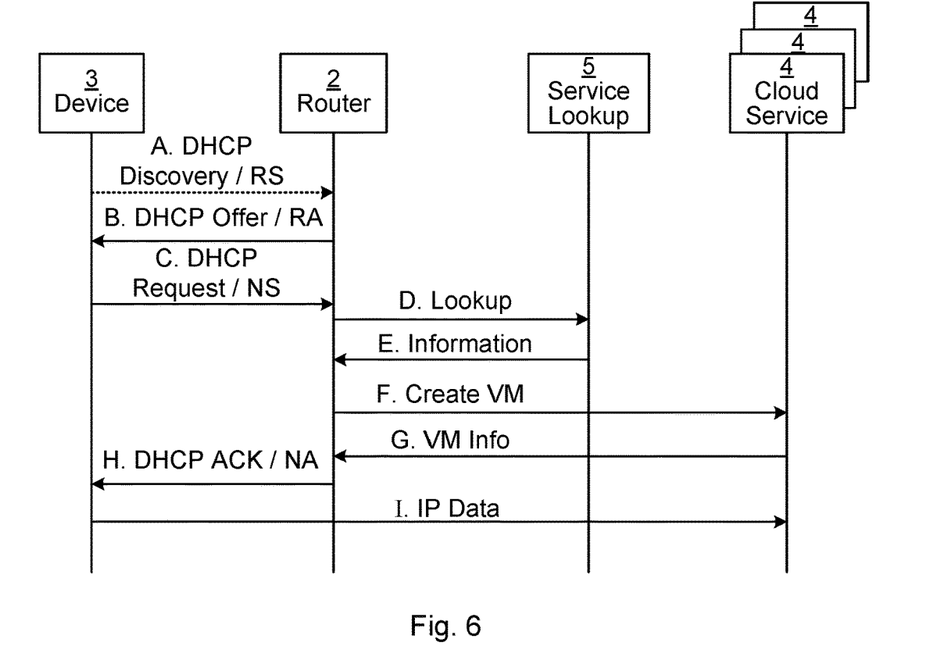
FIG. 6 is a schematic signalling diagram of a communication network in accordance with the present disclosure.

FIG. 6 is a signalling diagram which illustrates example embodiments of the present disclosure. The same message reference numerals as in FIG. 1 are used and reference is also made to FIG. 1 and the discussion thereof. The figure shows messaging involved in the cloud service creation over IPv6 ND or IPv4 DHCP. The IP device 3 involved in the signalling can be a constrained sensor device that has no capability to support cloud Service Provider (SP) API 43 for direct communication. The IP device 3 does not have to be a constrained sensor device to gain advantage from the present disclosure, however. For example, required signalling over the air interface can be reduced by means of embodiments of the present disclosure.

The NW node 2 in the form of a router may be a sensor network gateway providing the Internet access to the sensor device(s) 3. This NW node 2 normally has more processing capability that can be used for cloud SP communication on behalf of the IP devices 3. In addition, the Router 2 could be a gateway for more traditional IPv4 or IPv6 networks 1 (e.g. access router, public data network gateway (PDN GW), firewall, Network Address Translation (NAT), etc.).

The lookup service 5 function needs to be implemented and deployed for the routers 2 in order for them to map different devices 3 to different SPs cloud service platforms 4. If such a lookup service 5 is not available in the network 1, the information could instead be manually configured into the router/NW node 2.

The cloud service platform 4 may be either Infrastructure as a Service (IaaS) or Software as a Service (SaaS), offering service e.g. OpenStack cloud, or web service URL such as sensors.google.com.

Embodiments of the present disclosure extend the standard IP configuration protocols to create support for VM creation from NW nodes 2 in the network 1. These protocols are IPv6 ND [Neighbor Discovery for IP version 6 (IPv6), RFC4861, Internet Engineering Task Force (IETF)] and DHCPv6 [Dynamic Host Configuration Protocol for IPv6 (DHCPv6), Request for Comments (RFC) 3315, IETF] and IPv4 DHCP [Dynamic Host Configuration Protocol, RFC2131, IETF] protocols. In addition, embodiments of the present disclosure can be facilitated by IPv6 over Low power Wireless Personal Area Networks (6LoWPAN) ND protocol defined for constrained devices. All of these protocols provide a way for extending them through options that can be added into the protocol messaging. The new signalling described herein can be implemented into these protocols by defining new options to extend the protocols.

- A. DHCP Discovery/RS: An IP device 3 attaching to a network 1 will normally initiate IP configuration by sending a DHCP Discovery message (IPv4) or a Router Solicitation (RS) message (IPv6). If the IP device 3 requires a virtual machine (VM) it can indicate this by adding a new DHCP option or by setting a flag in the RS message.
- B. DHCP Offer/RA: A NW node/router 2 needs to indicate to the IP devices 3 attached to its network that it has the capability to create VMs for the devices 3. The indication is done by adding a new option into the DHCP Offer message (IPv4) or by setting a flag in the Router Advertisement (RA) message (IPv6).
- C. DHCP Request/NS: When a device 3 needs a cloud service it will indicate the need by adding a new option into a DHCP Request message (IPv4) or into a Neighbor Solicitation (NS) message (IPv6). This option needs to include a device identifier (e.g. a Media Access Control (MAC) address, a subscriber identity module (SIM) identity, etc.).
- D. Lookup Service Provider: When the Router 2 receives an indication from the device 3 requiring a cloud service, the Router 2 needs to lookup a suitable Service Provider (SP) cloud service platform 4 for the device 3. To lookup cloud service platforms 4 for devices 3 the router 2 sends the device identifier received from the device 3 to a lookup service 5.
- E. Service Provider Information: The lookup service 5 can be facilitated with e.g. Domain Name System (DNS). The lookup service 5 may need to have a capability to map device identifiers to service information of a cloud service platform 4. The service information is returned to the requesting router 2. Service information includes e.g. the IP address and the type of the cloud service platform 4.
- F. Create service: After successfully resolving SP information for a device 3, the router 2 can initiate service creation (e.g. a VM or a web page) in the cloud service platform 4. This can be done through a standard Cloud API 43 in the cloud service platform 4 (e.g. NOVA API in OpenStack). The API can be described as part of the service information (i.e. the type of the cloud service platform 4).
- G. Service Information: Once the service/VM 44 has been created, the router 2 will learn service information through the cloud API 43.
- H. DHCP ACK/NA: The router 2 can propagate the service information (IP address, URL, etc.) to the IP device 3 by adding the information into a new option in the DHCP ACK message (IPv4) or into the Neighbor Advertisement (NA) message (IPv6).

Figure 7A:
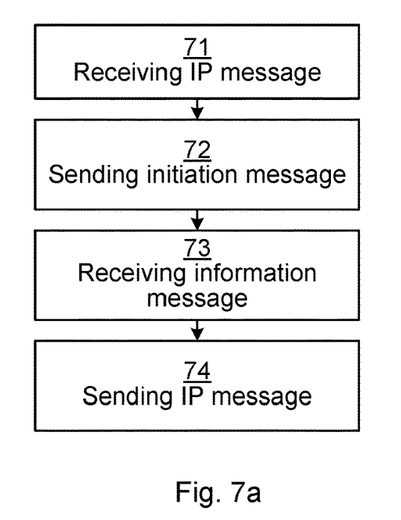
FIG. 7a is a schematic flow chart of an embodiment of a method performed by an IP capable network node, of the present disclosure.

FIG. 7a is a schematic flow chart of an embodiment of a method performed in/by a NW node 2, e.g. a router, of the present disclosure. The NW node 2 receives 71 an IP message C from an IP capable device 3. The IP message C comprises an indication that the IP capable device 3 requires a virtual machine (VM) 44 to be set up, e.g. for processing sensor data or such from the device 3 as discussed herein. The NW node 2 then sends 72 an initiation message F to a cloud service platform 4 requesting the cloud service platform to set up the VM 44 for the IP capable device 3. The cloud service platform 4 may, as discussed herein, comprise one or several cloud service servers of an SP. After the cloud service platform/SP 4 has set up the VM 44, the NW node 2 receives 73 a service information message G from the cloud service platform 4 comprising information about the VM 44 set up by the cloud service platform for the IP device 3. The NW node 2 then sends 74 an IP message H to the IP capable device 3 comprising information about the VM 44 set up for said device 3, allowing the device 3 to send IP data I to the VM 44 of the cloud service platform 4.

Figure 7B:
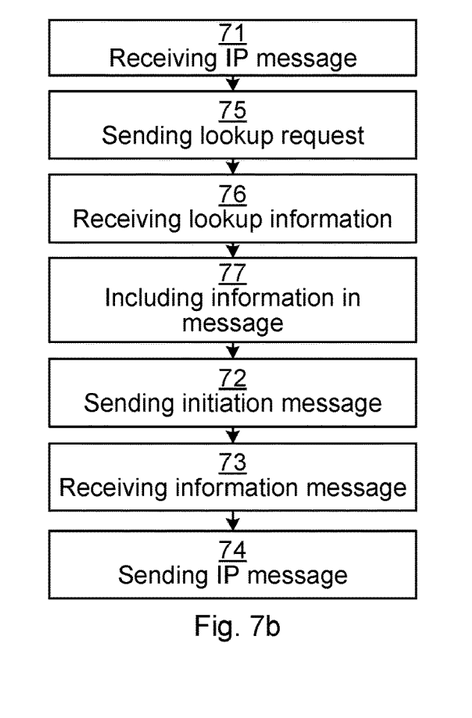
FIG. 7b is a schematic flow chart of another embodiment of a method performed by an IP capable network node, of the present disclosure.

FIG. 7b is a schematic flow chart of another embodiment of a method performed in/by a NW node 2 of the present disclosure. In addition to the steps of receiving 71 an IP message C, sending 72 the initiation message F, receiving 73 the information message G and sending 74 the IP message H, the method embodiment of FIG. 7b comprises some other signalling with a lookup service 5. This signalling may conveniently occur prior to the sending 72 of the initiation message F, and may occur before, after or concurrently with the receiving 71 of the IP message C. Thus, the NW node may, in some embodiments, send 75 a lookup request message D to a lookup service 5, comprising a device identifier for the IP capable device 3 and requesting information about the cloud service platform 4 for setting up the VM 44 for the IP capable device 3. The NW node may then receive 76 a lookup information message E from the lookup service 5, comprising the requested information, before sending 72 the initiation message F to the cloud service platform. Additionally or alternatively to requesting 75 and receiving 76 information about the cloud service platform 4, the NW node may obtain information about the IP capable device 3 from the lookup service/server 5, as discussed herein. Thus, in accordance with some embodiments of the method, the NW node 2 may send 75 a lookup request message D to a lookup service 5, requesting information about the IP capable device 3, after having received 71 the indication that said device requires the VM 44 to be set up. The NW node may then receive 76 a lookup information message E from said lookup service 4, comprising the requested information, after which the NW node 2 may include 77 the requested information in the initiation message F, before sending 72 the initiation message to the cloud service platform 4, thus informing the cloud service platform 4 about e.g. the identity or other properties of the IP device 3 which it may need for properly setting up the VM 44. A single lookup request message D may be sent 75, requesting information about both the cloud service platform 4 and the IP device 3, or separate requests may be sent. Similarly, a single or separate lookup information message(s) E may be received 76 as convenient.

Figure 8:
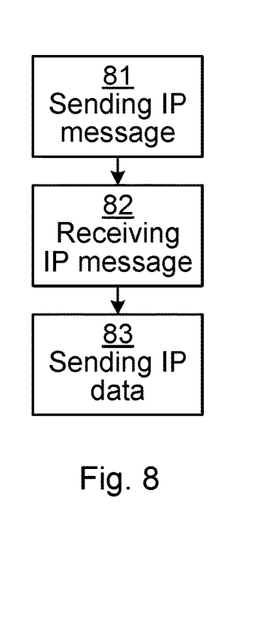
FIG. 8 is a schematic flow chart of an embodiment of a method performed by an IP capable device, of the present disclosure.

FIG. 8 is a schematic flow chart of an embodiment of a method performed in/by an IP capable device 3 of the present disclosure. An IP message C is sent 81 to an IP capable network node 2. The IP message C comprises an indication that the IP capable device 3 requires a VM 44 to be set up. Then, an IP message H is received 82 from the IP capable network node 2 comprising information about the VM 44 set up for said device, allowing the device to send IP data I to the VM. The IP device 3 then sends 83 IP data I, e.g. sensor data as discussed herein, to the VM 44.

Figure 9:
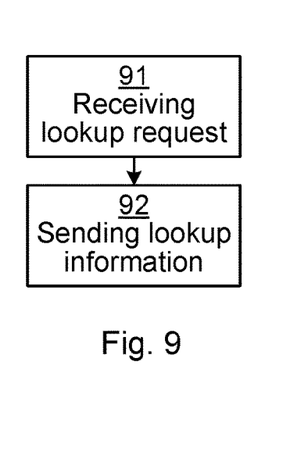
FIG. 9 is a schematic flow chart of an embodiment of a method performed by a lookup service, of the present disclosure.

FIG. 9 is a schematic flow chart of an embodiment of a method performed in/by a lookup server 5 of the present disclosure. The lookup server 5 receives 91 a lookup request message D from an IP capable network node 2, requesting information about a cloud service platform 4 for setting up a VM 44 for an IP capable device 3 other than the IP capable network node 2. Then, the lookup server 5 sends 92 a lookup information message E to said IP capable network node 2, comprising the requested information.

Figure 10:
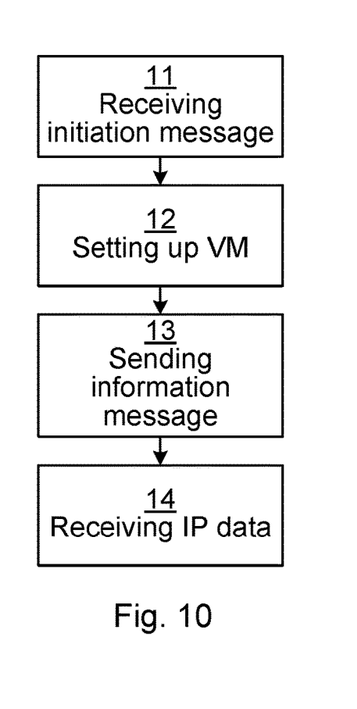
FIG. 10 is a schematic flow chart of an embodiment of a method performed by a cloud service platform, of the present disclosure.

FIG. 10 is a schematic flow chart of an embodiment of a method performed in/by a cloud service platform 4 of the present disclosure. The cloud service platform 4 is configured for setting up a VM 44 within said cloud service platform 4 in a communication network 1. The cloud service platform 4 receives 11 an initiation message F from an IP capable network node 2 in the communication network 1, requesting the cloud service platform 4 to set up a VM 44 for an IP capable device 3 other than the IP capable network node 2. The cloud service platform 4 then sets up 12 the VM 44, in accordance with the received 11 initiation message F. Then, the cloud service platform 4 sends 13 a service information message G to the IP capable network node 2, comprising information about the VM 44 set up 12 by the cloud service platform 4. This allows the IP device 3 to start sending data to the VM 44, as discussed herein. Thus, the service platform 4 then receives 14 IP data I to the VM 44 from the IP capable device 3.

Figure 11:
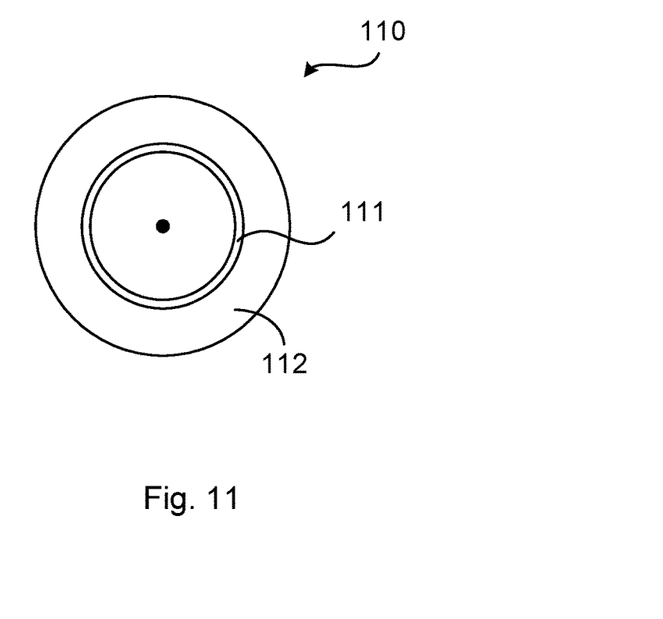
FIG. 11 is a schematic illustration of an embodiment of a computer program product of the present disclosure.

FIG. 11 illustrates a computer program product 110. The computer program product 110 comprises a computer readable medium 112 comprising a computer program 111 in the form of computer-executable components 111. The computer program/computer-executable components 111 may be configured to cause a device/node/server 2, 3, 4 and/or 5, e.g. as discussed herein, for setting up a VM for an IP device 3 in a communication network 1 to perform an embodiment of a method of the present disclosure. The computer program/computer-executable components may be run on the processor circuitry 21, 31, 41 or 51 of the device/node/server 2, 3, 4 or 5 for causing it to perform the method. The computer program product 110 may e.g. be comprised in a storage unit or memory 22, 32, 42 or 52 comprised in the device/node/server 2, 3, 4 or 5 and associated with the processor circuitry. Alternatively, the computer program product 110 may be, or be part of, a separate, e.g. mobile, storage means, such as a computer readable disc, e.g. CD or DVD or hard disc/drive, or a solid state storage medium, e.g. a RAM or Flash memory.

In some embodiments of the present disclosure, the IP message C is a Dynamic Host Configuration Protocol (DHCP) Request message in accordance with IPv4 or a Neighbour Solicitation (NS) message in accordance with IPv6.

In some embodiments of the present disclosure, the IP message C comprises a device identifier for the IP capable device 3. This identifier may e.g. be used for retrieving information about the IP device 3 and desired properties of a VM 44 set up for the IP device 3 from the lookup service 5 and/or the cloud service platform 4.

In some embodiments of the present disclosure, the lookup request message D comprises a device identifier for the IP capable device 3, and the lookup information message E comprises information dependent on said device identifier.

In some embodiments of the present disclosure, the lookup request message D also comprises a request for information 54 about the IP capable device 3, and wherein the lookup information message E comprises the requested information about the IP capable device.

In some embodiments of the present disclosure, the IP message C also comprises properties of the required VM 44. The IP device 3 may thus define desired properties of the VM 44 which should be set up.

In some embodiments of the present disclosure, the initiation message F initiates the setting up of the VM 44 in the cloud service platform 4 by means of a cloud Application Programming Interface (API) 43 e.g. a NOVA API in OpenStack which is an example of a suitable API.

In some embodiments of the present disclosure, the service information message G is transmitted via a cloud API 43 of the VM 44 and comprises information about said API for improved communication with the VM 44.

In some embodiments of the present disclosure, the IP message H comprises, as information about the VM 44, IP address or URL of the VM.

In some embodiments of the present disclosure, the IP message H is a DHCP acknowledgement (ACK) message in accordance with IPv4 or a Neighbour Advertisement (NA) message in accordance with IPv6.

In some embodiments of the present disclosure, the receiving 71 an IP message C from the device 3 is part of a bootstrap phase of the device 3. The bootstrap phase is a phase in which it may be convenient to have a VM 44 set up for the device 3.

In some embodiments of the present disclosure, the IP message C as well as the IP message H are radio messages over a radio interface 23. Embodiments of the present disclosure may be especially suitable for an IP radio device 3. Thus, the IP device 3 as well as the NW node 2 may comprise respective radio interfaces 23 and 33.

In some embodiments of the present disclosure, the IP capable network node 2 is a router, e.g. a default gateway router, configured for routing data communication of the IP capable device 3.

In some embodiments of the present disclosure, the IP device 3 is a constrained device, e.g. a Machine-to-Machine (M2M) device or Internet of Things (IoT) device, e.g. a sensor or detector.

In some embodiments of the present disclosure, the lookup server 5 holds information 53 about at least one available cloud service, including information about the cloud service platform 4 previously received from said cloud service platform 4, and wherein the lookup information message E comprises said cloud service information 53. Thus, the lookup service 5 and the cloud service platform(s) 4 may have negotiation between them. The lookup service 5 could be used as a Cloud Broker to figure out best suitable cloud service platform 4 for the IP device 3 (e.g. closest, cheapest, provide IoT services, provides mobility, etc.). So the lookup service 5 may talk with more than one cloud platform 4 from different service providers (operators, Amazon, cloud operators, etc.) to see which is the best available option for the given IP device 3. This could happen beforehand to form a database of available clouds service platforms 4 or when an IP device 3 is connecting and requests a VM 44.

Below follow some other aspects of the present disclosure.

According to an aspect of the present disclosure, there is provided an IP capable network node 2 in a communication network 1. The node comprises means 21 & 23 for receiving 71 an IP message C from an IP capable device 3, said IP message comprising an indication that the IP capable device requires a VM 44 to be set up. The node 2 also comprises means 21 & 24 for sending 72 an initiation message F to a cloud service platform 4 requesting the cloud service platform to set up the VM for the IP capable device. The node 2 also comprises means 21 & 24 for receiving 73 a service information message G from the cloud service platform comprising information about the VM set up by the cloud service platform. The node 2 also comprises means 21 & 23 for sending 74 an IP message H to the IP capable device comprising information about the VM set up for said device, allowing the device to send IP data I to the VM.

According to another aspect of the present disclosure, there is provided an IP capable device 3 in a communication network 1. The device 3 comprises means 31 & 33 for sending 81 an IP message C to an IP capable network node 2, said IP message comprising an indication that the IP capable device requires a VM 44 to be set up. The device 3 also comprises means 31 & 33 for receiving 82 an IP message H from the IP capable network node comprising information about the VM set up for said device, allowing the device to send IP data to the VM. The device 3 also comprises means 31 & 33 for sending 83 IP data I to the VM.

According to another aspect of the present disclosure, there is provided a lookup server 5 in a communication network 1. The server 5 comprises means 51 & 55 for receiving 91 a lookup request message D from an IP capable network node 2, requesting information about a cloud service platform 4 for setting up a VM 44 for an IP capable device 3 other than the IP capable network node. The server 5 also comprises means 51 & 55 for sending 92 a lookup information message E to said IP capable network node, comprising the requested information.

According to another aspect of the present disclosure, there is provided a cloud service platform 4 configured for setting up a VM 44 within said cloud service platform in a communication network 1. The cloud service platform 4 comprises means 41 & 45 for receiving 11 an initiation message from an IP capable network node 2 in the communication network, requesting the cloud service platform to set up a VM 44 for an IP capable device 3 other than the IP capable network node. The cloud service platform 4 also comprises means 41 for setting up 12 the VM. The cloud service platform 4 also comprises means 41 & 45 for sending 13 a service information message to the IP capable network node, comprising information about the VM set up by the cloud service platform. The cloud service platform 4 also comprises means 41 & 45 for receiving 14 IP data to the VM from the IP capable device.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by an Internet Protocol (IP) capable network node in a communication network, the method comprising:

receiving, by a radio interface of the IP capable network node from an IP capable device, a broadcast message with an indication indicating that the IP capable device requires a virtual machine (VM) to be created, wherein the IP capable device is a constrained IP capable device that has no capability to support direct communication with a cloud service provider (SP) application programming interface (API) in a cloud service platform;

sending, by the radio interface of the IP capable network node to the IP capable device, a message indicating the IP capable network node has a capability to create VMs;

receiving, by the radio interface of the IP capable network node from the IP capable device, an IP message comprising an indication that the IP capable device requires the VM to be created by the IP capable network node, and a device identifier for the IP capable device;

sending, by a communication interface of the IP capable network node to a lookup service, a lookup request message comprising the device identifier for the IP capable device, the lookup request message requesting information about a cloud service platform to be used for creating the VM to be created for the IP capable device, and device information about the IP capable device, after having received the indication that the IP capable device requires the VM to be created;

receiving, by the communication interface of the IP capable network node from said lookup service, a lookup information message comprising the requested information about the cloud service platform to be used for creating the VM to be created, and the device information which includes information about a type of IP data that the IP capable device will provide to the VM to be created, and an amount of the IP data that the IP capable device will provide to the VM to be created, as well as information about how the IP data should be handled by the VM to be created, and obtaining, by the IP capable network node, properties of the VM to be created based on the received lookup information message;

sending, by the communication interface of the IP capable network node to the cloud service platform, an initiation message requesting the cloud service platform to create a new VM having properties based on the received lookup information message for the IP capable device, wherein the IP capable network node used the received requested information to generate the initiation message;

receiving, by the communication interface of the IP capable network node from the cloud service platform, a service information message comprising information identifying the new VM; and sending, by the radio interface of the IP capable network node to the IP capable device, an IP message comprising the information identifying the new VM thus enabling the IP capable device to send IP data to the new VM.

2. The method of claim 1, wherein the received IP message is a Dynamic Host Configuration Protocol (DHCP) Request message in accordance with IPv4 or Neighbour Solicitation (NS) message in accordance with IPv6.

3. The method of claim 1, wherein the received IP message also comprises properties of the required VM.

4. The method of claim 1, wherein the initiation message initiates the setting up of the VM in the cloud service platform by means of a cloud Application Programming Interface (API).

5. The method of claim 1, wherein the service information message is received via a cloud Application Programming Interface (API) of the VM and comprises information about said API.

6. The method of claim 1, wherein the sent IP message comprises, as information about the VM, an IP address or uniform resource locator (URL) of the VM.

7. The method of claim 1, wherein the sent IP message is a Dynamic Host Configuration Protocol (DHCP) acknowledgement (ACK) message in accordance with IPv4 or a Neighbour Advertisement (NA) message in accordance with IPv6.

8. The method of claim 1, wherein the receiving the IP message from the IP capable device is part of a bootstrap phase of the IP capable device.

9. The method of claim 1, wherein said IP capable device is a sensor or a detector.

10. The method of claim 1, wherein the cloud service platform was selected from a plurality of cloud service platforms, and wherein the cloud service platform that was selected is one of following: (1) closest cloud service platform; or (2) cheapest cloud service platform.

11. An Internet Protocol (IP) capable network node in a communication network, the IP capable network node comprising:
a radio interface;
a communication interface;
processor circuitry; and
a storage unit storing instructions that, when executed by the processor circuitry, cause the IP capable network node to:
receive, by the radio interface from an IP capable device, a broadcast message with an indication indicating that the IP capable device requires a virtual machine (VM) to be created, wherein the IP capable device is a constrained IP capable device that has no capability to support direct communication with a cloud service provider (SP) application programming interface (API) in a cloud service platform;

send, by the radio interface to the IP capable device, a message indicating the IP capable network node has a capability to create VMs;

receive, by the radio interface from the IP capable device, an IP message comprising an indication that the IP capable device requires the VM to be created by the IP capable network node, and a device identifier for the IP capable device;

send, by the communication interface to a lookup service, a lookup request message comprising the device identifier for the IP capable device, the lookup request message requesting information about a cloud service platform to be used for creating the VM to be created for the IP capable device, and device information about the IP capable device, after having received the indication that the IP capable device requires the VM to be created;

receive, by the communication interface from said lookup service, a lookup information message comprising the requested information about the cloud service platform to be used for creating the VM to be created, and the device information which includes information about a type of IP data that the IP capable device will provide to the VM to be created, and an amount of the IP data that the IP capable device will provide to the VM to be created, as well as information about how the IP data should be handled by the VM to be created, and obtaining, by the IP capable network node, properties of the VM to be created based on the received lookup information message;

send, by the communication interface to the cloud service platform, an initiation message requesting the cloud service platform to create a new VM having properties based on the received lookup information message for the IP capable device, wherein the IP capable network node used the received requested information to generate the initiation message;

receive, by the communication interface from the cloud service platform, a service information message comprising information identifying the new VM; and send, by the radio interface to the IP capable device, an IP message comprising the information identifying the new VM thus enabling the IP capable device to send IP data to the new VM.

12. The IP capable network node of claim 11, wherein the IP capable network node is a router configured for routing data communication of the IP capable device.

13. The IP capable network node of claim 11, wherein said IP capable device is a sensor or a detector.

14. The IP capable network node of claim 11, wherein the cloud service platform was selected from a plurality of cloud service platforms, and wherein the cloud service platform that was selected is one of following: (1) closest cloud service platform; or (2) cheapest cloud service platform.

15. A method performed in an Internet Protocol (IP) capable device in a communication network, the method comprising:
sending, by a radio interface of the IP capable device to an IP capable network node, a broadcast message with an indication indicating that the IP capable device requires a virtual machine (VM) to be created, wherein the IP capable device is a constrained IP capable device that has no capability to support direct communication with a cloud service provider (SP) application programming interface (API) in a cloud service platform;

receiving, by the radio interface of the IP capable device from the IP capable network node, a message indicating the IP capable network node has a capability to create VMs;

sending, by the radio interface of the IP capable device to an IP capable network node, an IP message comprising an indication that the IP capable device requires the VM to be created by the IP capable network node, and a device identifier for the IP capable device for enabling the IP capable network node to retrieve device information about the IP capable device wherein the device information includes information about a type of IP data that the IP capable device will provide to the VM to be created, and an amount of the IP data that the IP capable device will provide to the VM to be created, as well as information about how the IP data should be handled by the VM to be created;

receiving, by the radio interface of the IP capable device from the IP capable network node, an IP message comprising information identifying a new VM created for said IP capable device based on at least the device information thus enabling the IP capable device to send IP data to the new VM; and sending, by the radio interface of the IP capable device, IP data to the new VM.

16. The method of claim 15, wherein said IP capable device is a sensor or a detector.

17. An Internet Protocol (IP) capable device in a communication network, the IP capable device comprising:
a radio interface;
processor circuitry; and
a storage unit storing instructions that, when executed by the processor circuitry, cause the IP capable device to:

send, by the radio interface to an IP capable network node, a broadcast message with an indication indicating that the IP capable device requires a virtual machine (VM) to be created, wherein the IP capable device is a constrained IP capable device that has no capability to support direct communication with a cloud service provider (SP) application programming interface (API) in a cloud service platform;

receive, by the radio interface from the IP capable network node, a message indicating the IP capable network node has a capability to create VMs;

send, by the radio interface to an IP capable network node, an IP message comprising an indication that the IP capable device requires the VM to be created by the IP capable network node, and a device identifier for the IP capable device for enabling the IP capable network node to retrieve device information about the IP capable device wherein the device information includes information about a type of IP data that the IP capable device will provide to the VM to be created, and an amount of the IP data that the IP capable device will provide to the VM to be created, as well as information about how the IP data should be handled by the VM to be created;

receive, by the radio interface from the IP capable network node, an IP message comprising information identifying a new VM created for said IP capable device based on at least the device information thus enabling the IP capable device to send IP data to the new VM; and sending, by the radio interface, IP data to the new VM.

18. The IP capable device of claim 17, wherein said IP capable device is a sensor or a detector.

* * * * *